Sept. 29, 1964 J. POMAGALSKI 3,150,610
GRIPPING DEVICE FOR TRANSPORT OR TOWING BY CABLE
Filed Oct. 31, 1961 2 Sheets-Sheet 1
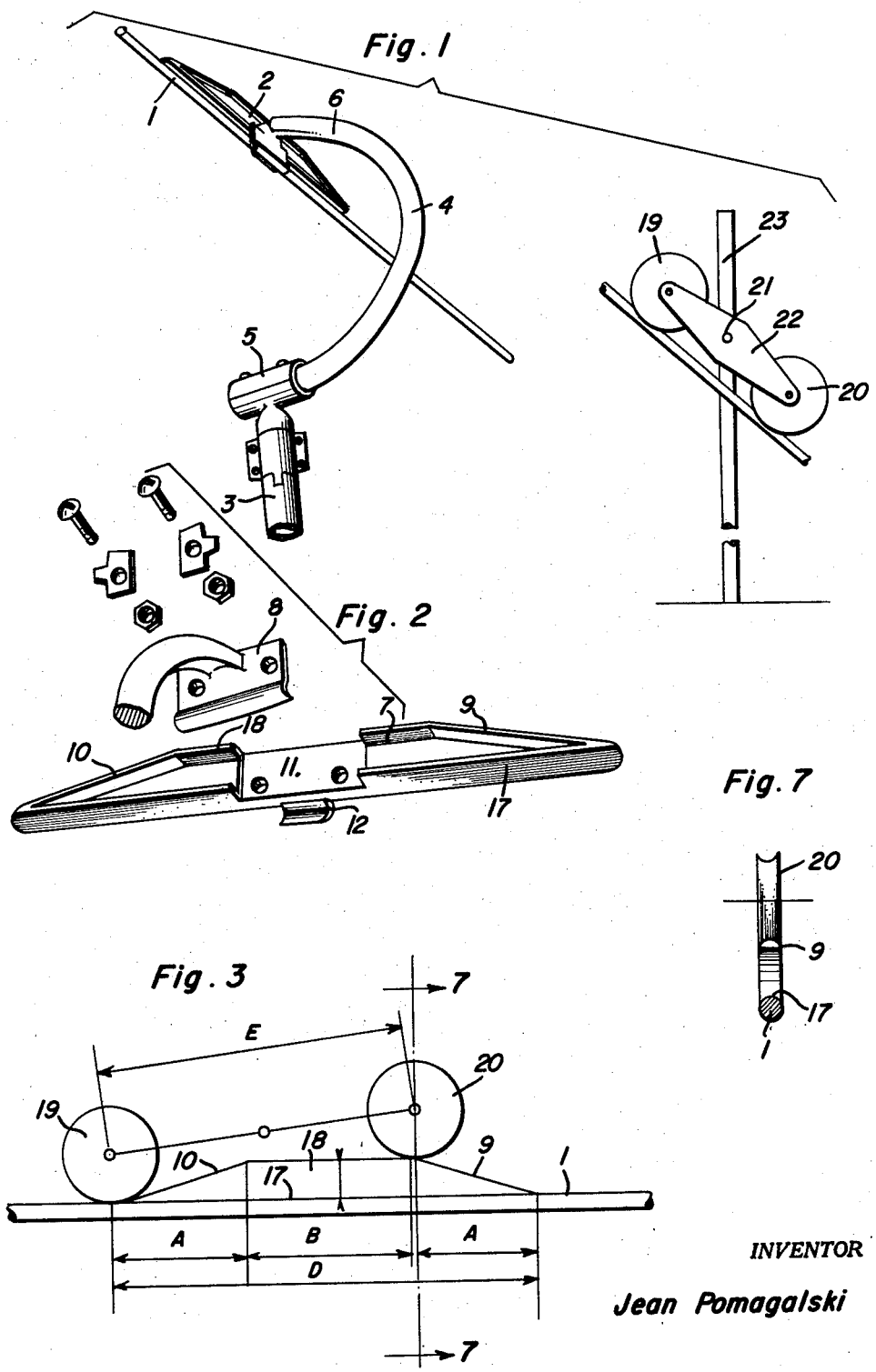
INVENTOR
Jean Pomagalski Sept. 29, 1964         J. POMAGALSKI         3,150,610
GRIPPING DEVICE FOR TRANSPORT OR TOWING BY CABLE
Filed Oct. 31, 1961                         2 Sheets-Sheet 2
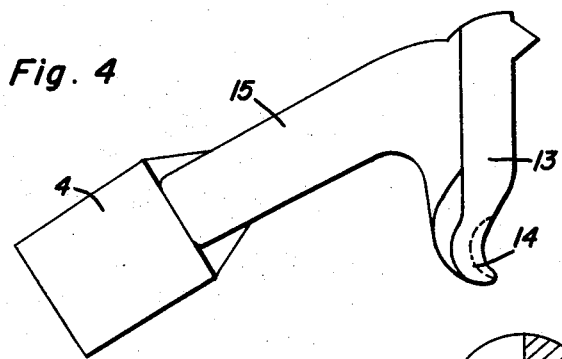
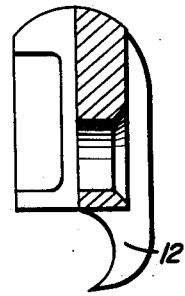
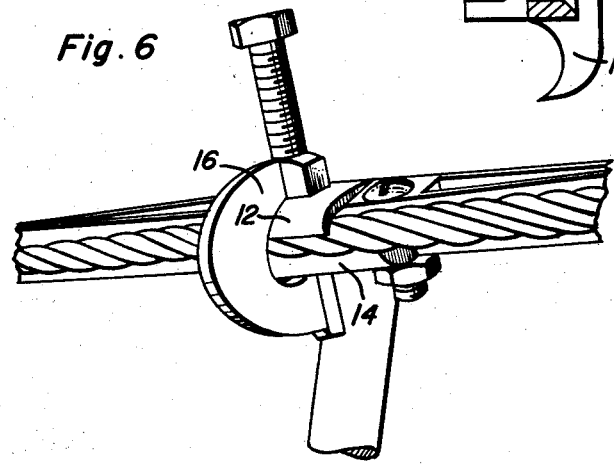
*INVENTOR*
*Jean Pomagalski*

United States Patent Office 3,150,610
Patented Sept. 29, 1964

3,150,610
GRIPPING DEVICE FOR TRANSPORT OR
TOWING BY CABLE
Jean Pomagalski, Fontaine, France, assignor to Societe
dite: Jean Pomagalski S.A., Fontaine, France
Filed Oct. 31, 1961, Ser. No. 149,081
Claims priority, application France June 12, 1961
5 Claims. (Cl. 104—200)

This invention relates to devices for transport or towing including a traction cable which may also be the carrier cable and relates in particular to gripping devices which are used to secure to the traction cable the devices by means of which the charges are transported or towed.

It is an object of the invention to provide a gripping device which allows the utilization of guiding sheaves or guiding rollers over, under or around which the cable may pass, having a deep groove, which offers considerable safety in avoiding the danger of derailment of the cable, and which, further, allows the suppression of jolting of the carrying devices when the gripping device passes under a train of compression sheaves.

It is a further object to provide gripping devices of minimum length, while assuring a smooth passage under the compression sheaves.

It is a still further object of the invention to provide a gripping device of extreme simplicity in manufacture, which requires practically no machining but which, by virtue of the method of attachment, offers increased safety, in comparison with gripping devices already in use, as regards adherence to the cable, even when the diameter of the latter has been reduced as a result of prolonged and heavy use.

It is another object to provide simple and rapid fitting and dismantling of the gripping device on or from the cable.

These and other objects and advantages of the invention will become readily apparent upon reading the following specification taken in conjunction with the accompanying drawings submitted for the purpose of illustration only and not intended to limit the scope of the invention, and in which:

FIG. 1 is a view of the gripping device and of a pair of sheaves in perspective.

FIG. 2 is an exploded view of the gripping device of FIGURE 1.

FIG. 3 represents schematically part of the gripping device.

FIG. 4 is a lateral view of a jaw element.

FIG. 5 is a transverse section of the other jaw element, this section being made in a plane passing through the axis of a hole provided for the bolt.

FIG. 6 shows, in a perspective view, the method of assembly, the cable being seen from below.

FIGURE 7 is a cross-section along line 7—7 of FIGURE 3.

On FIG. 1 the cable is shown at 1, the gripping assembly at 2 while at 3 the rod is shown which is commonly known as suspension or tow, and which has secured to its lower end (not shown) a seat or other device suitable for transport or towing. The rod 3 is linked to the gripping device 2 by the yoke 4 by means of a joint 5 which allows the oscillation of the rod in the vertical plane of the cable. This joint could equally well be located in the region 6.

In FIG. 2 is shown an exploded view of the gripping device which comprises a guiding element, shown at 7, and a second element shown at 8. Element 7 provides a guiding effect when the cable passes under the sheaves while element 8 has a guiding effect when the cable passes over the sheaves.

Element 7 comprises two guides in the form of ramps, shown at 9 and 10, one on either side of plate 11 and separated by a portion 18 parallel to the cable and the function of which will be explained hereafter. Below the plate is the first part 12 of the jaws which grip the cable. The element 8 which is best seen in FIG. 2 comprises a plate 13 designed to work in conjunction with plate 11 of element 7. The two plates which are brought into contact are assembled by means of two bolts passing through the holes, which may be seen on FIG. 2. Below plate 13 is located the second part 14 of the jaws. On the back of plate 13 is a shank 15 which is welded or fixed in some other way to the yoke 4.

As shown in FIG. 4, the jaw 14 is slightly concave, when considered in a direction parallel with the cable, in order to allow the deformation of the latter.

As is best seen in FIG. 6, the two parts 12 and 14 of the jaws have such dimensions that, even when tightened, they do not quite surround the cable, thus leaving a part of the cable free to contact the bottom of the groove in the guide sheaves 19 and 20 which are mounted rotatably on a support plate 22. This support plate 22 is pivoted on a pivot member 21 connected to a post 23.

FIGURE 7 is a cross-section along line 7—7 of the gripping device illustrated schematically in FIGURE 3 and shows the cable 1 engaged by the grooved base 17 of element 7, and the sheave 20 engaging the curved top of the guide ramp 9.

For fixing the gripping device on the cable a hand vice 16 is employed, by means of which it is possible to exert directly a considerable force on the jaws. This will slightly deform the cable and fix the jaws in position in the depression thus formed. The two bolts can then be introduced in the corresponding holes and thoroughly tightened by the corresponding nuts, which will give sufficient tightness to maintain the gripping device in position no matter what stresses are exerted by the suspension.

It will be an advantage to give to the bottom 17 of the guiding element 7 the shape of an arc of very large radius, in order to avoid any abrupt kinking of the cable during operation.

According to the invention, there is inserted between the two guide ramps 9 and 10 of the gripping device, a length 18 parallel with the cable and with the base 17 which, for the purpose of this description, can be compared with a straight line.

In fact, the introduction of the portion 18 permits a reduction of the total length of the gripping device, while retaining the advantage of the suppression of jolting, by causing sheave 19 of a train of sheaves to rise at the same time sheave 20 (see FIG. 3) starts to descend.

In fact, the points of ramps 9 and 10, also known as needles, are necessarily free in relation to the cable, in order to allow the passage of the cable over the sheaves or bull-wheels of the upper and lower terminals. A considerable length of ramp, combined with a short length of attachment of the gripping device on the cable creates a certain danger of swivelling of the gripping device and consequently of the ramps, thus entailing a risk of bringing the point of the ramp outside the cable, and thus outside the gauge of the groove in the sheave. Under these conditions, the gripping device can cause the cable to leave the sheaves. The gripping devices according to the invention therefore present a guide element of trapezoid form.

The formula to be applied is (see FIG. 3)

$$(A+B)^2 = e^2 - h^2$$

when:

A is the projection of a ramp 9 or 10 on the long base 17 of the trapezoid.

B is the length of the small base of the trapezoid.

D is the total length of the long base.

$e$ is the distance between the axes of the compression sheaves.

$h$ is the height of the trapezoid.

From this, we have:

$$(A+B)^2 = e^2 - h^2$$
$$A+B = \sqrt{e^2 - h^2}$$
(1) $\quad 2(A+B) = 2\sqrt{e^2 - h^2}$
(2) $\quad D = 2A + B$ By adding (1) and (2) we obtain:

$$2B + D = B + 2\sqrt{e^2 - h^2}$$
$$D = 2\sqrt{e^2 - h^2} - B$$

It is therefore advantageous to give to the small base 18 a length B between 0.2 and 0.6 times the length L of the long base.

What is claimed is:

1. In an aerial tramway, a traction cable movable along stationary guide sheaves, a connecting plate for rotatably supporting at least two sheaves in spaced relationship along said cable, means for pivotably securing said connecting plate to a stationary support, means for rotatably supporting said sheaves on said connecting plate, said sheaves having a peripheral groove for receiving said traction cable, a gripping device for securely gripping said traction cable at a selected position along its length, and a load supporting yoke connected to said gripping device, said gripping device including a trapezoid-shaped guide member having parallel top and bottom sides of unequal length, said bottom side being of greater length and in contact with the top side of said cable, the other sides of said trapezoid-shaped guide member being adapted to engage the grooves of said guide sheaves when said gripping device passes under said sheaves.

2. A device according to claim 1, wherein the two non-parallel sides of said guide member are of equal length.

3. A device according to claim 2 wherein the sides of said guide member meet the formula $D = 2\sqrt{e^2 - h^2} - B$, wherein D is the length of the longer of the two parallel sides, B is the length of the shorter of the two parallel sides, $e$ is the distance between the axes of two sheaves of a train of sheaves, and $h$ is the distance between the parallel sides.

4. A device according to claim 1, wherein the length of the shorter of said two parallel sides is between 0.2 and 0.6 times the length of the longer of said two parallel sides.

5. A device according to claim 1, wherein said gripping device includes a pair of jaws for gripping said cable, one of said jaws being secured to said guide member, the other of said jaws being secured to said load-carrying yoke.

References Cited in the file of this patent

UNITED STATES PATENTS

| | | |
|---|---|---|
| 1,076,337 | Vogel et al. | Oct. 21, 1913 |
| 2,152,235 | Bannerman et al. | Mar. 28, 1939 |
| 2,250,339 | Whittum | July 22, 1941 |
| 2,765,753 | Nixon | Oct. 9, 1956 |
| 2,840,008 | Lodvick et al. | June 24, 1958 |

FOREIGN PATENTS

| | | |
|---|---|---|
| 325,402 | Germany | Sept. 11, 1920 |